US005103940A

United States Patent [19]

Meneut et al.

[11] Patent Number: 5,103,940

[45] Date of Patent: Apr. 14, 1992

[54] SELF-ADJUSTING BRAKE INCORPORATING WEAR COMPENSATION

[76] Inventors: Jean-Claude Meneut, Germigny l'exempt, 18150 Chateaubodot; Christian Eon, rue des Sources, 58640 Coulanges Les Nevers, both of France

[21] Appl. No.: 514,958

[22] Filed: Apr. 26, 1990

[30] Foreign Application Priority Data

Apr. 28, 1989 [FR] France ............................... 89 05708

[51] Int. Cl.$^5$ ............................................. F16D 65/20

[52] U.S. Cl. ................................... 188/72.6; 188/72.9

[58] Field of Search .................... 188/71.1, 71.7, 72.6, 188/72.9, 196 A; 200/82 D, 82 DA, 82 A, 537, 538

[56] References Cited

U.S. PATENT DOCUMENTS

| | | | |
|---|---|---|---|
| 1,961,004 | 5/1934 | Lemaitre et al. | 200/82 D |
| 2,276,028 | 3/1942 | Dick | 200/82 D |
| 3,109,517 | 11/1963 | Butler . | |
| 3,604,454 | 9/1971 | Tomko et al. | 200/61.86 X |
| 3,604,538 | 9/1971 | Tompkin | 188/72.9 X |
| 3,768,598 | 10/1973 | Pollinger et al. . | |
| 4,592,451 | 6/1986 | Persson | 188/72.9 X |

FOREIGN PATENT DOCUMENTS

| | | |
|---|---|---|
| 3542937 | 6/1987 | Fed. Rep. of Germany . |
| 1153135 | 3/1958 | France . |
| 1247707 | 10/1960 | France . |
| 1561274 | 3/1969 | France . |
| 2136791 | 12/1972 | France . |
| 2598763 | 11/1987 | France . |
| 1261547 | 1/1972 | United Kingdom . |

*Primary Examiner*—Robert J. Oberleitner
*Assistant Examiner*—Peter M. Poon
*Attorney, Agent, or Firm*—Longacre & White

[57] ABSTRACT

A brake comprises two pivoting arms adapted to apply brake shoes to a member to be braked, a disk, for example, and a piston-and-cylinder actuator with one member, either the cylinder or the piston, coupled to one of the arms and the other member coupled to the other arm. A brake application device connected to one chamber of the actuator urges the piston in one direction and a brake release device connected to the other chamber urges the piston in the opposite direction. An electrical switch has two parts of which one is adapted to move with one part of the actuator and the other is adapted to move with the other part of the actuator. A lost-motion coupling is provided between one part of the electrical switch and the associated part of the actuator.

22 Claims, 4 Drawing Sheets

SELF-ADJUSTING BRAKE INCORPORATING WEAR COMPENSATION

BACKGROUND OF THE INVENTION

1. Field of the invention

The present invention is generally concerned with brakes, usually for industrial use, of the kind comprising two pivoting arms adapted to apply brake pads to a member to be braked, a disk, for example, and a piston-and-cylinder actuator with one member, either the cylinder or the piston, coupled to one of said arms and the other member coupled to the other arm, together with brake application means connected to one chamber of said actuator to urge its piston in one direction and brake release means connected to the other of said chambers to urge said piston in the opposite direction.

2. Description of the prior art

A brake of this kind is described in published French patent application No 2 598 763 filed 16 May 1986.

In this brake the release means constitute a pressure generator comprising a pump to feed pressurized fluid to the corresponding chamber of the actuator commanded as required by a motor. The pump flow is controlled by a pressure-operated switch.

When the brake is released, the corresponding chamber of the actuator, previously vented, is supplied with fluid under pressure by this pump and the pressure in it rises gradually until it balances the oppositely directed force exerted by the associated application means.

The piston of the actuator then moves in a direction corresponding to releasing the brake, until it comes into contact with an abutment.

From this moment the pressure in the chamber of the actuator concerned begins to rise again to a maximal value at which the pressure switch stops the pump.

As leaks are inevitable in the corresponding circuit, the pressure in this chamber then begins to fall gradually.

If it reaches a minimal threshold value the pressure switch restarts the pump.

Thus this brake is held open (released) by a pressure switch operating in a cyclic manner associated with a pressure difference between a maximal pressure and a restarting threshold.

This arrangement has given satisfaction and may continue to do so.

It has the following disadvantages, however.

First of all, when it is required to be reliable, as is obviously the case in this application, a pressure-operated switch is relatively costly, which is prejudicial to the overall unit cost.

This disadvantage is aggravated when the pressure switch must be explosion-proof so that it can be used in a potentially explosive atmosphere.

Also, the necessity for the piston of the actuator to come into contact with an abutment means that its travel may be greater than that strictly necessary to release the brake and this superfluous movement inevitably results in some wear of the actuator.

What is more, because of its relatively low sensitivity a pressure switch requires a relatively high threshold for restarting the pump, this threshold being related to the pressure difference for which the pressure switch must operate.

The result is that the motor is started relatively frequently, imposing relatively high fatigue stresses on the pressure generator as a whole and causing significant overheating, prejudicial to durability.

Another result is the risk of excessive pressure at the actuator piston seal, which is prejudicial to safety.

Finally, it is necessary to provide means for systematically compensating wear of the brake pads, failing which the closing travel of the brake pads and therefore the response time of the brake would increase to an unacceptable degree as such wear proceeded.

At present these wear compensating means are usually mechanical means using a chock and a screw to form an abutment. Complicated, and therefore relatively costly, such systems are ill adapted to accommodating possible axial displacement and/or warping of the disk, with the attendant risk of continuous contact between the brake pads and the disk leading to the risk of unacceptable overheating of the disk or even unacceptable deterioration of the brake as a whole.

A general object of the present invention is an arrangement for circumventing these disadvantages which confers additional advantages.

SUMMARY OF THE INVENTION

The present invention consists of a brake comprising two pivoting arms adapted to apply brake pads to a member to be braked, a piston-and-cylinder actuator with one member, either the cylinder or the piston, coupled to one of said arms and the other member coupled to the other arm, brake application means connected to one chamber of said actuator to urge its piston in one direction, brake release means connected to the other of said chambers to urge said piston in the opposite direction, an electrical switch having two parts of which one is adapted to move with one part of said actuator and the other is adapted to move with the other part of said actuator, and a lost-motion coupling in the linkage between one part of said electrical switch and the associated part of said actuator.

On releasing the brake, initially the electrical switch remains closed because of the lost-motion coupling.

It is not until a second stage that, the brake having been released, the electrical switch opens to stop the pump motor.

Apart from the fact that the electrical switch used in accordance with the invention is considerably less costly than a pressure switch it has the advantage of being operated on the basis of a differential travel rather than a differential pressure.

The actuator piston therefore has no need to come into contact with an abutment in order to be operative and the threshold at which it restarts the pump can advantageously be relatively low.

The overall advantages of the electrical switch include:

reduced wear of the actuator as the travel of its piston is limited to just what is necessary, reduced wear of the pressure source because, given the ratio of the cross-sections in the actuator cylinder and the actuator's overall efficiency, the maximum pressure in the actuator chamber connected to the pressure source may be reduced and also because, given the reduced travel of the actuator piston, the time for which the actuator is operated at this maximal pressure is also reduced.

The following advantages also result from the use of the electrical switch:

the brake is able to move longitudinally, to accommodate optimally possible axial displacement and/or warping of the disk, the system is insensitive to environmental parameters including temperature, relative humidity and dust, adjustments and/or repairs can be carried out without working on the power part, because of the mechanical linkages between the various components, the system can be adapted to a range of different brake powers without requiring specific adjustments, the risk of leakage between the chambers of the actuator is reduced, so reducing the risk of excessive braking torque, the electrical switch may be used for other functions and/or one or more other electrical switches may be associated with the brake control system, it is possible to use a standard and therefore inexpensive commercially available switch, even in the case of an explosion-proof electrical switch.

Finally, the electrical switch used in accordance with one aspect of the invention has the advantage of enabling self-adjustment that is pre-calibrated by the play in the lost-motion coupling, the brake pads and/or the travel of the brake actuator, so forming in itself means for compensating wear of the brake pads.

Accordingly, and in accordance with a second aspect of the invention, the linkage between at least one part of the electrical switch and the corresponding part of the actuator is a sliding linkage controlled by friction means.

This sliding linkage is displaced progressively as the wear increases.

The travel to release the brake therefore remains the same without the use of any chock or screw to form an abutment.

The result of this is a very significant saving in manufacturing cost.

What is more, no special tools or adjustments are required on changing the brake pads.

When the brake pads are changed, the brake reverts to its initial configuration of its own accord the first time the brakes are applied.

The characteristics and advantages of the invention will emerge from the following description given by way of non-limiting example only with reference to the appended diagrammatic drawings.

DETAILED DESCRIPTION OF THE INVENTION

Figure 1:
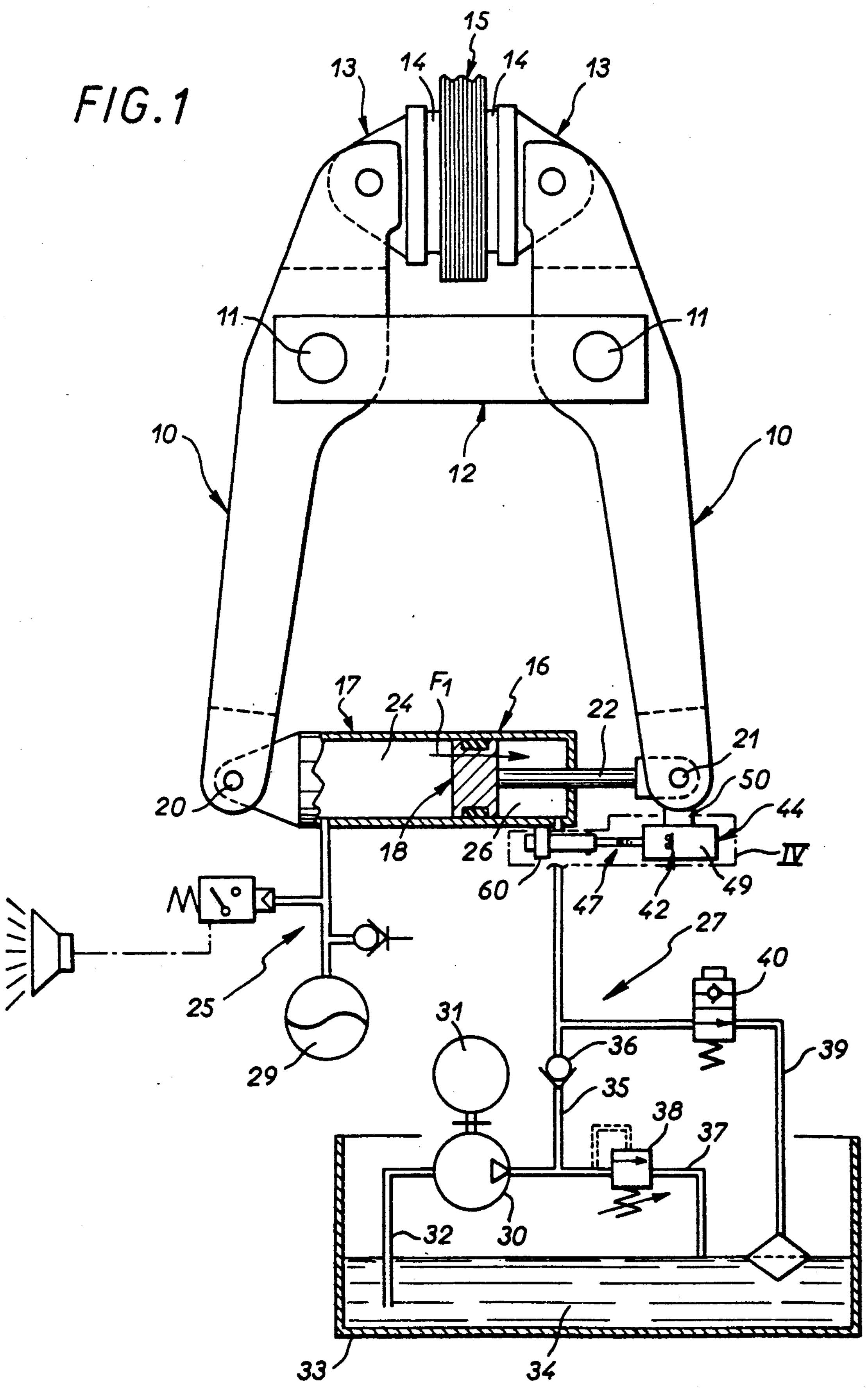
FIG. 1 is a view in elevation and cross-section of a brake in accordance with the invention, shown when the brake is applied.

As shown in the figures, the brake in accordance with the invention is of the kind comprising two arms 10 pivoted at points intermediate their ends at pivots 11 on a fixed common crossmember 12. At one end they are adapted to apply brake shoes 13 with brake pad 14 to a member 15, a disk, for example, to be braked. At the opposite end of the arms 10 is a piston-and-cylinder actuator 16 the cylinder 17 and the piston 18 of which are coupled to respective arms 10.

The cylinder 17 of the actuator 16 is articulated at 20 to one arm 10 and the other arm 10 is articulated at 21 to a piston rod 22 attached to the piston 18.

The piston 18 divides the interior of the cylinder 17 into two sealed chambers. A chamber 24 on the side opposite the piston rod 22 is coupled to brake application means 25 adapted to urge the piston 18 in one direction as shown by the arrow $F_1$ in FIG. 1. A chamber 26 on the same side as the piston rod 22 is coupled to brake release means 27 adapted to urge the piston 18 in the opposite direction as shown by the arrow $F_2$ in FIG. 2.

As described in the previously mentioned French patent application, in this embodiment the application means 25 comprise a hydraulic/pneumatic accumulator 29 disposed externally of the cylinder 17 of the actuator 16.

In this embodiment, and in a known way, the release means 27 constitute a pressure source comprising a pump 30 for feeding fluid under pressure to the chamber 26. The pump is driven by an electric motor 31 and its suction inlet 32 is connected to a tank 33 containing a sufficient quantity of appropriate fluid 34. Its outlet 35, incorporating a non-return valve 36, is connected to the chamber 26.

Branching from this outlet 35 are a first return pipe 37 controlled by a safety valve 38 and a second return pipe 39 controlled by a solenoid valve 40.

According to the invention, the release means 27 are under the control of an electrical switch 42 (figures 3 through 7) of which one part 43, forming the fixed contacts, is linked to one of the component parts 17, 18 of the actuator 16 by a linkage 44 to be described in more detail later so as to move with the latter. The other part 46 of the electrical switch, forming the moving contact, is coupled to the other component 17, 18 by a linkage 47, also to be described in detail later, so as to move with it. The linkage 44, 47 for one of these parts 43, 46 incorporates lost-motion coupling means 48.

In the embodiment shown the part 43 of the electrical switch 42 forming the fixed contacts is carried by a box 49 attached by a lug 50 to the arm 10 to which the piston 18 of the actuator 16 is coupled by the piston rod 22 and which therefore forms part of the linkage 44. The part 43 forming the fixed contacts is therefore positively coupled to the piston 18 so as to move with it.

In this embodiment the part 46 of the electrical switch 42 forming the moving contact is coupled to the cylinder 17 of the actuator 16 so as to move with it by the linkage 47 and it is this linkage which incorporates the previously mentioned lost-motion coupling means 48.

This linkage 47 comprises two telescopic rods 51 and 52. The inner rod 51 carries a pin 53 and the outer rod 52 includes a slot 54 in which said pin 53 is trapped.

The pin 53 and the slot 54 constitute the lost-motion coupling means 48.

Figure 4:
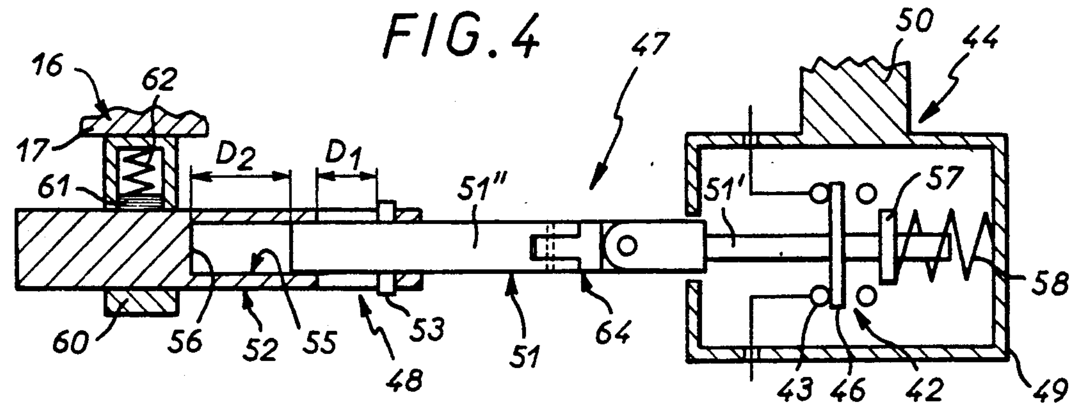
FIG. 4 shows in axial cross-section and to a larger scale the detail of FIG. 1 identified by the box IV in FIG. 1.

In FIG. 4, $D_1$ denotes the travel of the pin 53 in the slot 54.

The rod 51 slides in the rod 52 without friction or in such a way that the axial force due to friction is, by design, very much smaller than the force needed to operate the electrical switch 42.

The rod 52 incorporates a blind hole 55 forming a housing for the rod 51.

$D_2$ denotes the distance between the back 56 of this housing and the corresponding end of the rod 51 when, as shown in FIG. 4, the pin 53 is butted up against the end of the slot 54 away from the back 56.

The fixed distance $D_2$ is, by design, greater than $D_1$.

The rod 51 is the part of the linkage 47 which carries the part 46 of the electrical switch 42 forming the moving contact.

Extending beyond this part 46, it carries an abutment flange 57 and a spring 58 between this flange and the back of the box 49 urges the rod 51 at all times towards the rod 52 and therefore urges the electrical switch 42 at all times towards the closed position.

In the case of at least one of the parts 43, 46 of the electrical switch 42, the linkage 42, 47 between the part 43, 46 and the corresponding part 17, 18 of the actuator 16 includes a sliding coupling controlled by friction means.

In the embodiment shown this applies only to the linkage 47 between the part 46 of the electrical switch 42 forming the moving contact and the cylinder 17 of the actuator 16, in other words the linkage including the previously described lost-motion coupling means 48.

One of the telescopic rods of the linkage 47, in this instance the rod 52, is to this end slidably inserted into a bearing 60 fastened to the cylinder 17 of the actuator 16 and the corresponding friction means comprise, housed within the bearing 60, a pad 61 urged at all times into contact with the rod 52 by spring means 62 in the form of a simple spring.

The axial force produced by these friction means is, by design, greater than the force needed to operate the electrical switch 42.

Ball-joint means 64 are preferably operative in at least one of the linkages 44, 47 between the two parts 43, 46 of the electrical switch 42 and the component parts 17, 18 of the actuator 16.

In the embodiment shown this applies only to the linkage 47 and the corresponding ball-joint means 64 comprise at least one universal joint between two sections 51', 51" of the rod 51.

Figure 3:
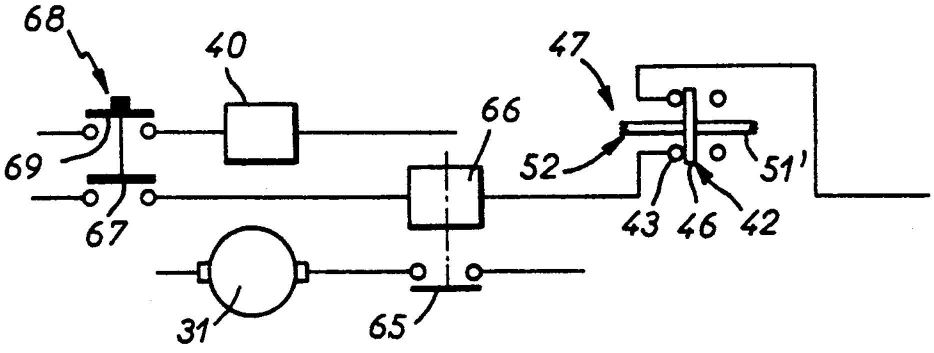
FIG. 3 is a block diagram relating to the control of the motor associated with the brake.

As shown in FIG. 3, the supply of power to the motor 31 is controlled by an electrical contact 65 of a relay 66 in a control circuit comprising, in series, the electrical switch 42 and an electrical contact 67 operated by a latching pushbutton 68 accessible to the user.

The latching pushbutton 68 also controls the supply of power to the solenoid valve 40 by way of a contact 69.

When the brake in accordance with the invention is applied, as shown in FIGS. 1 and 4, the electrical switch 42 is closed by the action of the spring 58 on it and the latching pushbutton 68 is open.

As the motor 31 is not supplied with power the pump 30 is not running and the solenoid valve 40 connects the chamber 26 of the actuator 16 to the tank 33.

Only the brake application means 25 are operative, by way of the chamber 24 of the actuator 16.

Acting on the piston 18 in the direction of the arrow $F_1$ in FIG. 1, they hold the brake applied.

For this applied position of the brake, which corresponds to a separation movement of the arms 10, the pin 53 of the lost-motion coupling means 48 is abutted against the end of the slot 54 away from the bearing 60 (FIG. 4).

When the brake is to be released the latching pushbutton 68 is pressed. It latches in its closed position.

Figure 2:
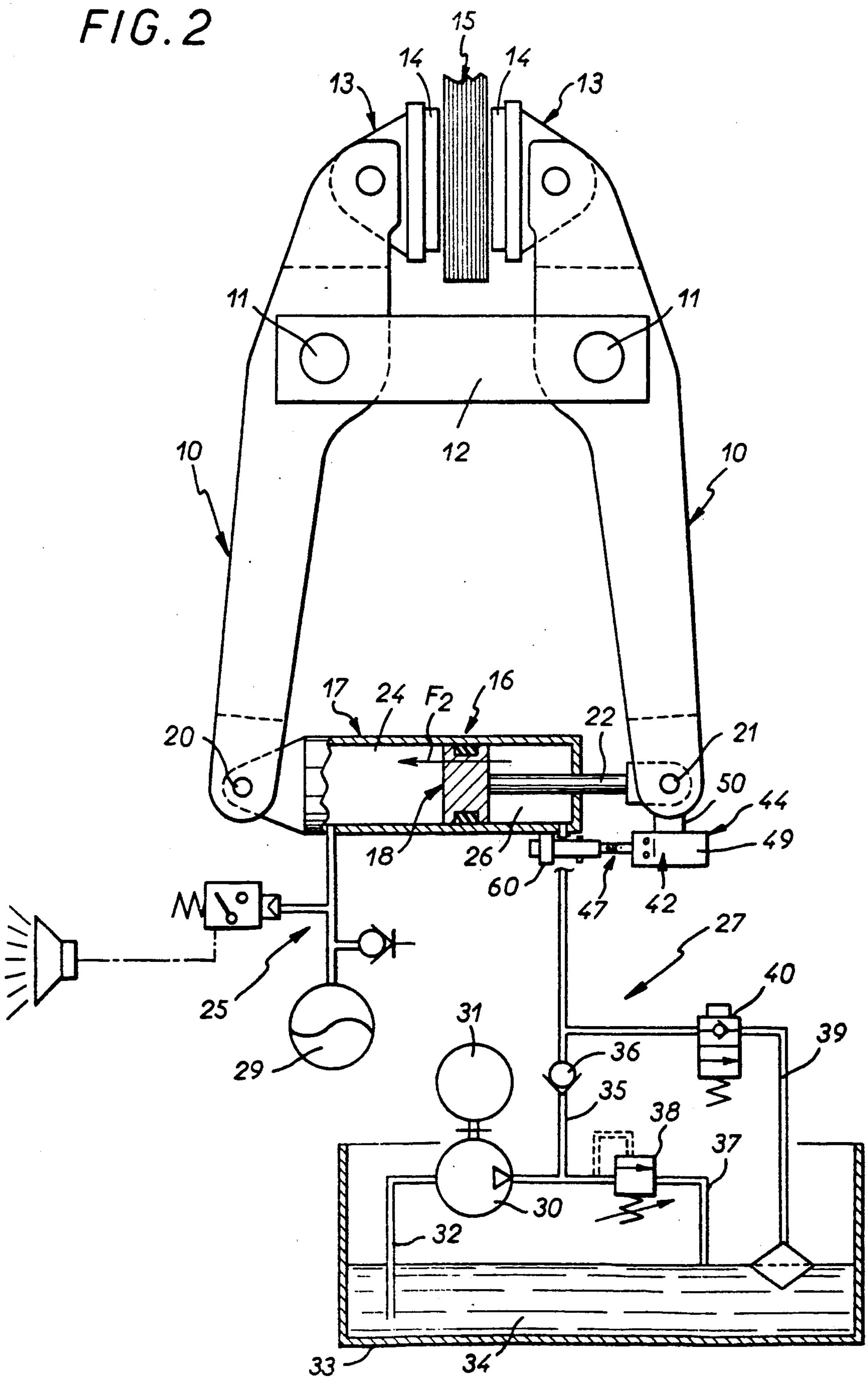
FIG. 2 is a view analogous to that of FIG. 1 showing the brake when released.

The contacts 67 and 65 respectively activate the motor 31 (and therefore the pump 30) and the solenoid valve 40 to blank off the corresponding circuit (FIG. 2).

Figure 8:
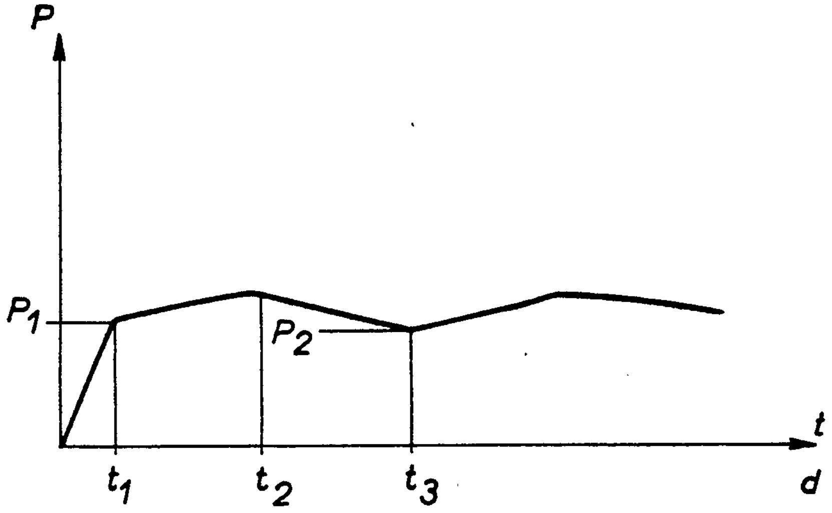
FIG. 8 is a pressure diagram relating to the operation of the brake.

In the diagram in FIG. 8 the time or the displacement d of the piston 18 of the actuator 16 is plotted on the horizontal axis and the pressure P in the chamber 26 of the actuator 16 is plotted on the vertical axis. The pressure P in the chamber 26 rises gradually.

The pressure $P_1$ after a time $t_1$ is sufficient to balance the force applied by the brake application means 25. Because the pump 30 continues to operate, the piston 18 of the actuator 16 moves progressively from right to left as indicated by the arrow $F_2$ in FIG. 2.

From this time $t_1$, and because of the displacement of the piston 18, the pressure P in the chamber 26 of the actuator 16 rises only slightly.

Because of this displacement of the piston 18 the arms 10 are moved towards each other and the brake is released.

Because of this relative movement towards each other of the arms 10 the linkages 44, 47 carrying the two parts 43, 46 of the electrical switch 42 are themselves caused to move towards each other.

Figure 5:
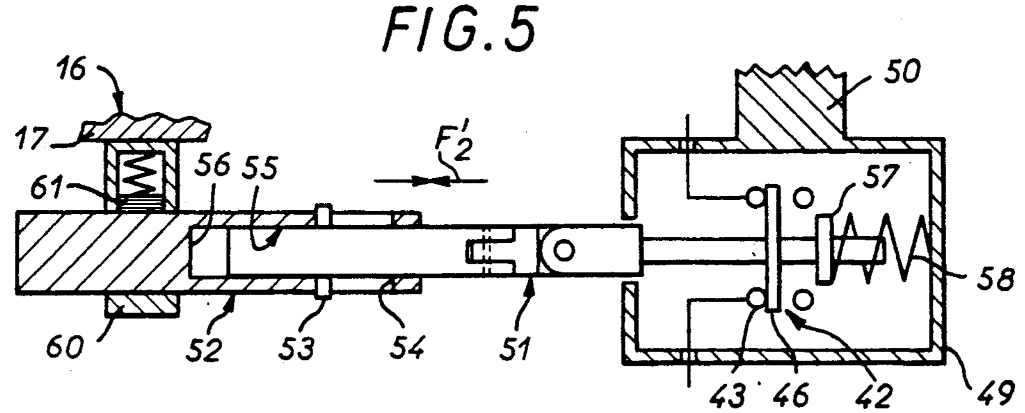
FIGS. 5 through 7 are views analogous to that of FIG. 4 showing how the brake in accordance with the invention operates.

In other words, the box 49 and the bearing 60 tend to move towards each other, as shown by the double-headed arrow $F'_2$ in FIG. 5.

Because of the lost-motion coupling means 48 incorporated into the linkage 47 and because the force needed to operate the electrical switch 42, controlled by the spring 58, is very much higher than the friction between the rods 51 and 52, the only initial result is movement of the rod 51 into the rod 52 within the limits of relative movement $D_1$ permitted by the lost-motion coupling means 48 until the pin 53 abuts against the end of the slot 54 away from the box 49 (FIG. 5).

As shown in FIG. 5, until the corresponding time $t_2$ the electrical switch 42 remains closed and the pump 30 therefore continues to operate.

Figure 6:
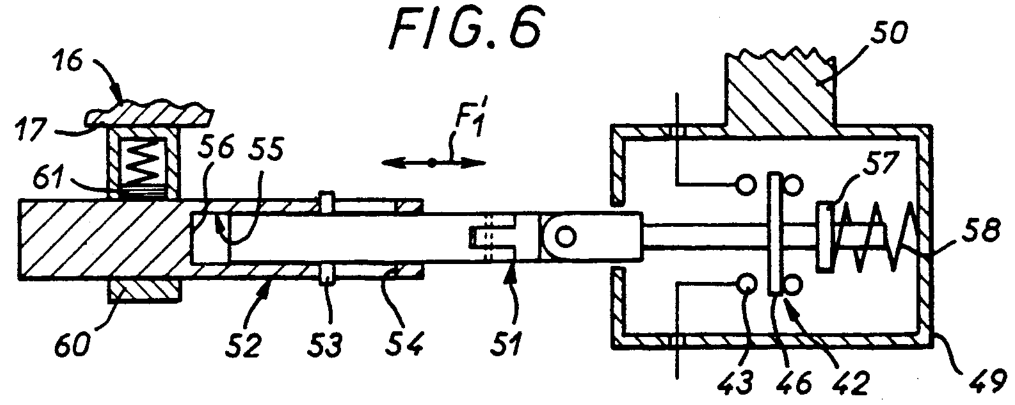

The electrical switch 42 opens at time $t_2$ (FIG. 6).

This interrupts the supply of power to the motor 31 and therefore the supply of fluid under pressure to the chamber 26 of the actuator 16 by the pump 30.

Because of inevitable leaks in the hydraulic circuit to which it is connected, the pressure P in this chamber 26 then begins to fall gradually. When it reaches the equilibrium pressure $P_1$ again, the piston 18 of the actuator 16 begins to move in the opposite direction.

As shown by the double-headed arrow $F'_1$ in FIG. 6, this results in relative movement of the box 49 away from the bearing 60, causing the electrical switch 42 to return to the closed position due to the action of the spring 58.

In practice the electrical switch 42 closes at a restarting pressure $P_3$ which is very close to the equilibrium pressure $P_1$, differing from the latter only because of the corresponding, very small travel of the part 46 of the electrical switch 42 forming the moving contact.

Be this as it may, at the corresponding time $t_3$ the closing of the electrical switch 42 restarts the motor 31 and the pump 30 therefore increases the pressure P in the chamber 26 of the actuator 16.

This rise in pressure at time $t_3$ starts a new cycle, of the same kind as previously.

In this way the brake is kept released.

In what has been described so far, and because of the axial forces involved, the rod 52 of the linkage 47 does not move relative to the bearing 60 in which it is held.

This does not apply if, with the brake applied (FIGS. 1 and 4), the brake pads 14 carried by the brake shoes 13 are worn to some degree, as is inevitably the case in practice.

Because of this wear, and because of the force exerted by the brake application means 25, the arms 10 gradually move further apart, this movement being compensated by a left to right movement of the piston 18 of the actuator 16, in the direction of the arrow $F_1$ in FIG. 1.

Figure 7:
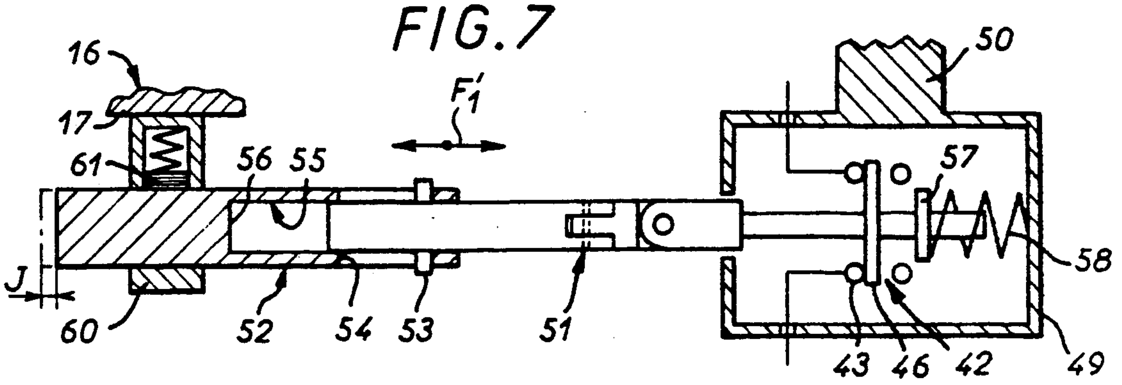

This results in the box 49 and the bearing 60 being urged farther apart, in the direction of the double-headed arrow $F'_1$ in FIG. 7.

However, the rod 52 is entrained by the rod 51 because at this time the pin 53 carried by the rod 51 is abutted against the end of the slot 54 away from the bearing 60.

In other words, and as will be clear from the clearance J shown in FIG. 7, the result is a gradual displacement of the rod 52 relative to the bearing 60 which holds it, in proportion to the degree of wear.

This has the advantage of systematically compensating such wear.

When it is released, the brake returns to the same configuration as previously described.

The same process occurs when the brake is applied for the first time after replacing the brake pads 14.

Because the separation between the brake pads when the brake is released corresponds to the travel $D_1$ of the pin 53 in the slot 54, it is sufficient to change the rod 52 which incorporates the slot 54 to change this distance, if required.

Figure 9:
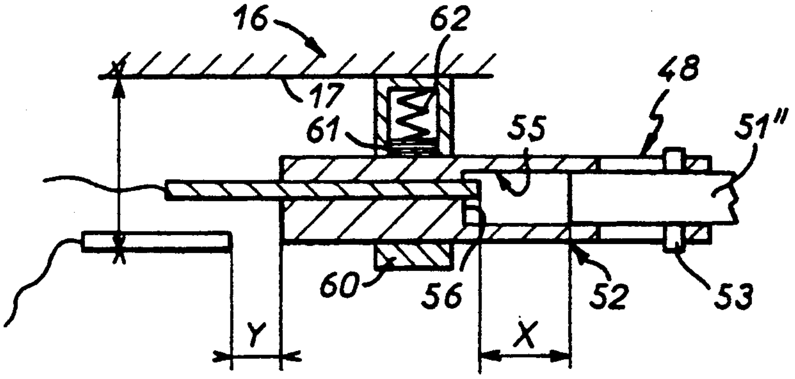
FIG. 9 is a view in axial cross-section analogous to that of FIG. 4 and relating to an alternative embodiment.

In the embodiment shown in FIG. 9 a position sensor 70 is operative between the rods 51, 52 of the linkage 47 incorporating the lost-motion coupling means 48.

The released or applied condition of the brake can be sensed by virtue of the fact that $D_2$ is fixed as is therefore the distance X, when the brake is applied, between the end of the rod 51 and the back 56 of the blind housing 55 in the rod 52.

To sense the position of the rod 51 in the rod 52 the position sensor 70 passes parallel to the axis of the system through the back 56 of the blind housing 55 in the rod 52, towards the rod 51.

This embodiment also exploits the fact that the rod 52 moves in the bearing 60 as the brake pads 14 on the brake shoes 13 wear down to indicate to the user when the brake pads have reached their normal limit of wear.

To this end a fixed position sensor 71 is associated with the rod 52.

It faces towards the end of the rod 52, at a distance Y from the latter which decreases as wear proceeds.

It could, for example, trigger an alarm when the distance Y becomes zero.

Of course, the present invention is not limited to the embodiments described and shown but encompasses any variant execution thereof.

Specifically, a pump operating continuously may be used as the pressure source incorporated in the brake release means.

Likewise, a mechanical spring may be used for the brake application means.

There is claimed:

1. Brake comprising two pivoting arms for applying brake pads to a member to be braked, a piston-and-cylinder actuator comprising a cylinder member and a piston member, one of the cylinder and piston members being coupled to one of said arms and the other of the piston and cylinder members being coupled to the other arm, brake application means connected to one chamber of said actuator to urge the piston member in one direction, brake release means connected to another chamber of said actuator to urge said piston member in the opposite direction, an electrical switch having two parts, one of the parts of said electrical switch being movable with one member of said actuator and the other of the parts being movable with the other member of said actuator, and a lost-motion coupling means in a linkage between one switch part and the corresponding actuator member, said lost-motion coupling means comprises two telescopic rods, one of said telescopic rods carrying a pin and another of the telescopic rods incorporating a slot, the pin being engaged in the slot, and position sensing means between said rods, said sensing means incorporating said lost-motion coupling means.

2. Brake according to claim 1 wherein said linkage comprises a sliding linkage, including friction means generating friction to inhibit sliding of said linkage, one of said telescopic rods being slidably engaged in a bearing fastened to a corresponding actuator member.

3. Brake according to claim 2 comprising a fixed position sensor associated with said rod slidably engaged in said bearing.

4. Brake according to claim 2 wherein the friction means comprises a friction pad accommodated in said bearing, and spring means constantly urging said friction pad into contact with said one rod.

5. Brake according to claim 2, wherein said friction means generates an axial friction force greater than a force required to operated said electrical switch.

6. Brake according to claim 2 comprising ball-joint means between the two parts of said electrical switch and the members of said actuator.

7. Brake according to claim 2 wherein one part of said electrical switch comprises fixed contacts and a box accommodating said fixed contacts being attached to said arm to which the piston member is coupled by a piston rod and thereby positively coupled to said piston to move therewith, and wherein another part of said electrical switch comprises a moving contact and is coupled to the cylindrical member so as to move therewith.

8. Brake according to claim 2, wherein said brake release means comprises a motor-driven pump for supplying fluid under pressure to the corresponding chamber of said actuator and a control circuit including a relay controlling the supply of said pump including, connected in series, said electrical switch and an electrical contact operated by a latching pushbutton.

9. Brake according to claim 1 comprising ball-joint means between the two parts of said electrical switch and the two members of said actuator.

10. Brake according to claim 1 wherein one part of said electrical switch comprises fixed contacts, a box accommodating such fixed contacts being attached to said arm to which the piston member is coupled by a piston rod and thereby positively coupled to said piston to move therewith, and wherein another part of said electrical switch comprises a moving contact and is coupled to the cylinder member so as to move therewith.

11. Brake according to claim 1, wherein said brake release means comprises a motor-driven pump for supplying fluid under pressure to a corresponding chamber of said actuator and a control circuit including a relay controlling the supply of said pump including, connected in series, said electrical switch and an electrical contact operated by a latching pushbutton.

12. Brake comprising two pivoting arms for applying brake pads to a member to be braked, a piston-and-cylinder actuator comprising a cylinder member and a piston member, one of the cylinder and piston members being coupled to one of said arms and the other of the piston and cylinder members being coupled to the other arm, brake application means connected to one chamber of said actuator to urge the piston member in one direction, brake release means connected to another chamber of said actuator to urge said piston member in the opposite direction, an electrical switch having two parts for controlling the brake release means, one of the parts of the switch being movable with one of said actuator members and the other of the parts of the switch being movable with the other of said actuator members and a linkage between a said switch part and a corresponding said actuator member, said linkage including a lost-motion coupling means, an automatic brake wear compensating means disposed between a first one of said switch parts and a first one of said actuator members, said compensating means comprising a sliding connection and associated friction gripping means.

13. Brake according to claim 12, wherein said linkage, comprises two telescopic rods, said lost-motion means comprising a pin on one of said rods engaged in a sot in the other of said rods.

14. Brake according to claim 13 wherein said linkage comprises a sliding linkage, one of said rods being engaged in a bearing fastened to said first actuator member.

15. Brake according to claim 14 wherein said friction means comprises a friction pad accommodated in said bearing, and spring means constantly urging said friction pad into contact with said one rod.

16. Brake according to claim 13 comprising a fixed position sensor associated with said one rod engaged in said bearing.

17. Brake according to claim 12 wherein said friction means generates an axial friction force greater than a force required to operate said electrical switch.

18. Brake according to claim 12 comprising ball joint means between each of said switch parts and the respective actuator members.

19. Brake according to claim 12 wherein one part of said electrical witch comprises fixed contacts, a box accommodating said fixed contacts being attached to said arm to which the piston member is coupled by a piston rod and thereby positively coupled to said piston to move therewith, and wherein another part of said electrical switch comprises a moving contact and is coupled to the cylinder member so as to move therewith.

20. Brake according to claim 12 wherein said brake release means comprises a motor-driven pump for supplying fluid under pressure to the other chamber of said actuator and a control circuit including a relay controlling the supply of power to said pump including, connected in series, said electrical switch and an electrical contact operated by a latching pushbutton.

21. Brake comprising two pivoting arms for applying brake pads to a member to be braked, a piston-and-cylinder actuator comprising a cylinder member and a piston member, one of the cylinder and the piston members being coupled to one of said arms and the other of the piston and cylinder members being coupled to the other arm, brake application means connected to one chamber of said actuator to urge the piston member in one direction, brake release means connected to another chamber of said actuator to urge said piston member in the opposite direction, an electrical switch having two parts, one of the parts of the switch being movable with one of said actuator members and the other of said switch parts being movable with the other of said actuator members, and a linkage between a said electrical switch part and a corresponding said actuator member, said linkage including a lost-motion coupling means, and a ball-joint means disposed in said linkage between a said electrical switch part and a corresponding actuator member.

22. Brake comprising two pivoting arms for applying brake pads to a member to be braked, a piston-and-cylinder actuator comprising a cylinder member and a piston member, one of the cylinder and the piston members being coupled to one of said arms and the other of the piston and cylinder members being coupled to the other arm, brake application means connected to one chamber of said actuator to urge the piston member in one direction, brake release means connected to another chamber of said actuator to urge said piston member in the opposite direction, an electrical switch having two parts, one of the parts of the switch being movable with one of said actuator members and the other of said switch parts being movable with the other of said actuator members, and a linkage between a said electrical switch part and a corresponding said actuator member, said linkage including a lost-motion coupling means, and a motor-driven pump for supplying fluid under pressure to the other chamber of said actuator, and a control circuit including a relay for supplying power to said motor-driven pump and including, connected in series, said electrical switch and an electrical contact operated by a latching pushbutton.

* * * * *